United States Patent [19]

Schumacher

[11] Patent Number: 5,058,008

[45] Date of Patent: Oct. 15, 1991

[54] MAIL SYSTEM WITH PERSONALIZED TRAINING FOR USERS

[75] Inventor: Karl H. Schumacher, Westport, Conn.

[73] Assignee: Pitney Bowes Inc., Stamford, Conn.

[21] Appl. No.: 416,746

[22] Filed: Oct. 3, 1989

[51] Int. Cl.$^5$ ............................................. G06F 15/20
[52] U.S. Cl. ................................ 364/401; 364/464.02; 434/118
[58] Field of Search .............. 364/401, 464.02, 464.03, 364/408; 434/118

[56] References Cited

U.S. PATENT DOCUMENTS

| | | | |
|---|---|---|---|
| 4,541,056 | 9/1985 | Matthews | 364/200 |
| 4,622,013 | 11/1986 | Cerchio | 434/118 |
| 4,648,062 | 3/1987 | Johnson et al. | 364/900 |
| 4,754,326 | 6/1988 | Kram et al. | 364/900 |
| 4,760,534 | 7/1988 | Fougere et al. | 364/466 |
| 4,772,206 | 9/1988 | Kerr et al. | 434/118 |
| 4,837,701 | 6/1989 | Sansone et al. | 364/464.03 |
| 4,941,829 | 7/1990 | Estes et al. | 434/118 |

OTHER PUBLICATIONS

Sullivan, Robert F., "Hypermedia Comes to Training", Training & Development Journal, vol. 43, p. 17(3), May 1989.

Leeke, Jim, "Tailored Training Gives Firms a Better PC Fit", Sep. 22, 1987.

O'Leary, Meghan, "Expert Systems: Custom Training at Low Cost", PC Week, vol. 5, No. 8, p. 47(2), Feb. 23, 1988.

"Customized Computer-Based Training", Government Data Systems, vol. 14, No. 1, p. 46, Jan. 1985.

Primary Examiner—Jerry Smith
Assistant Examiner—Russell Cass
Attorney, Agent, or Firm—Peter Vrahotes; Melvin J. Scholnick; David E. Pitchenik

[57] ABSTRACT

A method, apparatus and system are disclosed that provide a cost effective work-sharing installation for preprocessing mail. The disclosed system includes a data center and postal user inter connected by way of data communications links. The data center maintains a database of user's profiles, and uses that information to provide user's with training materials personalized to the user's needs.

14 Claims, 6 Drawing Sheets

MAIL SYSTEM WITH PERSONALIZED TRAINING FOR USERS

FIELD OF THE INVENTION

This invention relates to a method and apparatus for implementing a work-sharing mail preprocessing system. More specifically, the invention relates to improvements in such work-sharing systems using data sharing to increase the cost effectiveness of the mail preprocessing installation for the user.

BACKGROUND OF THE INVENTION

As described in copending U.S. patent application Ser. No. 285,891, filed Dec. 16, 1988, whose contents are hereby incorporated by reference, the United States currently has the world's largest postal system. The U.S. Post Offices currently handle in excess of 100 billion pieces of mail per year, about half the total volume handled throughout the world. The servicing of mail delivery involves three essential steps; collection, sorting and delivery. Collection takes place through a series of post offices spread throughout the United States. The United States has about 30,000 post offices that provide mail services in addition to 9,000 smaller postal center which provide some kind of some type of mail service. Postal employees typically take letters and packages from mail box facilities to the nearest local office where it is accumulated for the sorting procedure.

At the post office, postal clerks remove collected mail from sacks, bundle packages and segregate mail by size and class into separate categories. The mail travels by truck from local post offices to a central facility known as a sectional center. The United States has 264 sectional centers, some of which serve hundreds of local post offices. The sectional center processes nearly all the mail coming or going from its region. At the sectional center, high speed automated equipment sorts large volumes of mail. The postal service currently uses two sorting systems. One system is devoted to letters and other first class mail, and the other system, for bulk mailing, is used to sort packages, magazines advertising, circulars and other large mail. The letter sorter process involves manually moving mail sacks onto moving conveyor belts, which carry the mail to a machine called an edger-feeder which sorts it according to envelope size.

The postal service regulates the size of envelopes to make such mechanical sorting easier. Moreover, the equipment available at the post office includes automatic optical character readers and bar code readers. Based on the information derived from this equipment, the incoming mail can be sorted, usually first by region, and later by individual zip code. In general, the U.S. Postal Service provides discounts on postage rates if the mailer preprocesses its mail to lighten the post office workload. Thus, discounts are available for pre-sorting the mail, or for using barcoding, or for using address printing with fonts that can be read by automated equipment, as well as in other ways to be described. As a result, there are many ways available for the mailer or user of the postal system to cut their costs, if they are fully cognizant of postal system regulations in force which are applicable to the mailer's activities.

In the commonly-assigned, referenced, copending application Ser. No. 285,891, the concept of work sharing, wherein a user provides certain processing activities prior to delivering the mail to the central postal facilities, has been proposed. This is a positive innovation in the field of mail processing which may have a substantial impact in the future implementation of mail services. However, placing a burden on the user to provide certain of the facilities and services which the U.S. Postal Service facilities now provide is an equally heavy burden for the user, and must be done in a manner which permits the user to realize substantial savings despite its own increased work load. The user must be able to take advantage of the reduced postal service rates without the resulting costs exceeding the benefit provided to the user by its work-sharing mail preprocessing installation.

The U.S. Postal Service has already recognized the ability of users to preprocess certain kinds of mail and will accept mail in bulk delivered from a processor along with certification that its procedures have been complied with, and will accept such certification as prima facia justification for reduction in postal service rates. Thus, for example, manifest systems, wherein a manifest is provided to the central post office representative of a group of documents preprocessed by the user, are already known and do allow the user to realize a substantial reduction in rate. However, a large number of additional services, aside from manifesting services, may also be provided by the user and accepted as such by the central processing facility of the postal service in exchange for rate reductions. These additional services, however, require interface communications between a data center and the user so as to maintain within the user's facility up-to-date information regarding internal postal procedures, such as rates, volume, quantity discounts and the like in order for the post office facility to accept as valid a certification by the user that certain procedures mandated by the Postal Service have been complied with.

Mail processing systems having work-sharing features are discussed not only in application Ser. No. 285,891, but also in commonly-assigned copending applications Ser. Nos. 234,977 filed Aug. 23, 1988, and in U.S. Pat. No. 4,713,761. These applications relate to the concept of using certain limited user-provided mailing services. The '761 patent relates to accounting and billing, and does not solve the problem of relieving the postal service of substantial service burdens in an effective manner. Prior art manifest or "passport" systems—see, for example, commonly assigned U.S. Pat. No. 4,837,701, while allowing some form of certification, are difficult to implement in small user situations due to lack of trained personnel.

In order to contribute to the profitable operation of a user's work-sharing preprocessing installation, mail processing will have to be automated, and will require data sharing through the use of telephone or other data communication links. Of course, the use of such communication interfaces for computer operations is well known. For instance, commonly-assigned U.S. Pat. No. 4,122,532 discloses a telecommunication system for updating postal rate information at remote locations. However, the implementation of preprocessing services that were previously provided by a post office requires a trained mailroom operator, and the problems encountered in maintaining a trained mailroom staff needed to enable users to take advantage of such services remain a serious limitation on the installations' profitability.

SUMMARY OF THE INVENTION

It is an object of the present invention to provide a method and apparatus which will assist users to take maximum advantage of mail processing opportunities.

It is a further object of the present invention to provide a system and method for improving implementation of the work-sharing concept in mail processing.

It is another object of the present invention to provide a method and system that will enable users of mailing services to optimize rate reductions.

Apparatus in accordance with the present invention provides a system which allows a data center to provide training materials for use of a mail delivery service to each of remote user locations to apprise the user's employees of current and new techniques in mailing, postal rates, available and new types of services, and other means or modes by which a local user may take advantage of the preprocessing capability at the user's facility for additional rate discounts. In accordance with this aspect of the invention, the local users are connected via a data communications network or links to a data center which maintains sets of training instructions for various kinds of users. Via the data network, the data center maintains a database of user profiles, meaning a description of the user's mailing activities or usage of a mailing service. The data center can download to a particular user training packages customized or personalized for that particular user's needs.

In copending application Ser. No. 285,891, it was already recognized that the existence of a data communications network for certification purposes provided a convenient mechanism for providing to a user on request information to assist it to comply with Postal regulations. What the present invention recognizes is that such information as contemplated in the prior application might not be sufficient for a user to optimize its performance, mainly because the information would be too general since intended for all users, and might not fully meet the personal needs of a particular user. What the present invention also recognizes is that it becomes possible to personalize training programs for each user in accordance with the customers it serves. To accomplish this personalization requires information from the user, among other things, of listings of destinations it sends mail to. This can be achieved in one of two way. In the first way, a user would transmit to the data center its location and listings of destinations it frequently sends mail to.

In accordance with another aspect of the invention, it is recognized that if any of the systems described in copending applications Ser. Nos. 285,891; 285,145; 285,904; 285,486; or concurrently filed applications Ser. Nos. 416,745; 416,735; or 416,732 are implemented, then the data center would already have a database of each user's activities including addressee files. Thus, the information to personalize training for such a user is already on-hand and can easily be used as the basis for selecting training modules to suit a user's specific needs.

Other advantages and benefits of the system of the invention will be described hereinafter.

BRIEF DESCRIPTION OF THE DRAWINGS

The features and advantages of the present invention will be more clearly understood from the detailed description of the invention provided below, considered in conjunction with the accompanying drawings wherein.

In the referenced copending application Ser. No. 285,891, a networked system of users or mailers, a data center, and the Postal Service is described in detail. It would be helpful in understanding the present invention to provide a summary of the system description given in that application, with reference to FIGS. 1-4.

SUMMARY OF PRIOR APPLICATION DISCLOSURE INCORPORATED HEREIN

Figure 1:
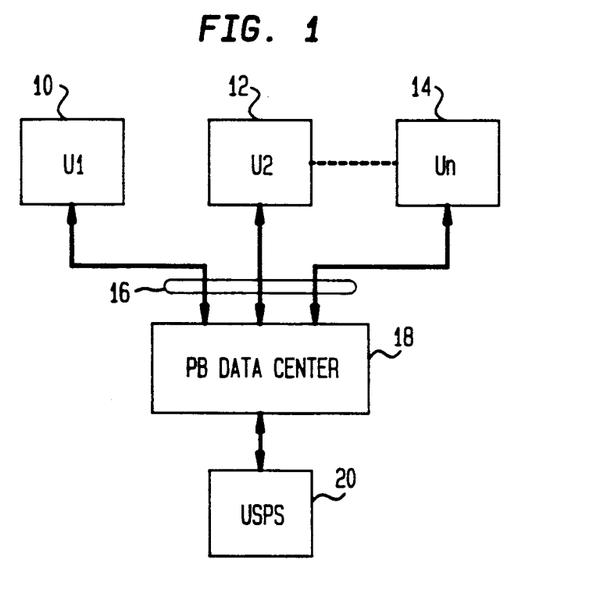
FIG. 1 is a functional block diagram illustrating the relationship between a data center, the U.S. Postal Service, and local users on a network.

With reference to FIG. 1, a plurality of user stations designated as $U_1$, $U_2$ ... $U_n$, and identified as 10, 12 and 14 are shown. It will be understood that multiple user stations are possible in excess of the three shown, and that these are shown by way of example only. These stations are coupled by means of an interconnection data communication network, illustrated generally as 16, to the data center 18, which in turn may be appropriately coupled by means of a secure data line or the like to the U.S. Postal Service 20. The data center is a facility run by a commercial operation, such as Pitney Bowes, Inc., the assignee of the present invention. Each of the blocks 10, 12, 14, 18 and 20 contemplate the use of data processing components, each appropriately interlinked by means of high speed telecommunication links or the like for the purposes of exchanging information. It is also contemplated within the scope of the invention that the U.S. Postal Service will maintain an appropriate computer facility, not specifically described herein, which will possess the capability of uploading and downloading specific pieces of information upon request by the data center, and relating to appropriate postal rules and regulations which will effect the use of certain discounts in mailing postal rates, as well as other factors necessary for the concept of shared work services which will be certified by each of the individual user stations in order to qualify for additional discounts when mail is received in the U.S. Postal Service facilities. The specific pieces of information will also be information relating to Postal Service planning and operations, as well as carriers that may be available for use and routing. The communication link is also contemplated as a two-way link between units 18 and 20, wherein the U.S. Postal Service can have, if desired, the capability of monitoring specific operations within the data center in order to ensure the data center is operational in accordance with rules and requirements which may be imposed by the Postal Service from time to time. The monitoring operation can be periodic unscheduled communication link examinations of certain storage areas of accessed memory locations for confirming proper operations. Of course, visual on-site inspections and examinations may also be made.

Figure 2:
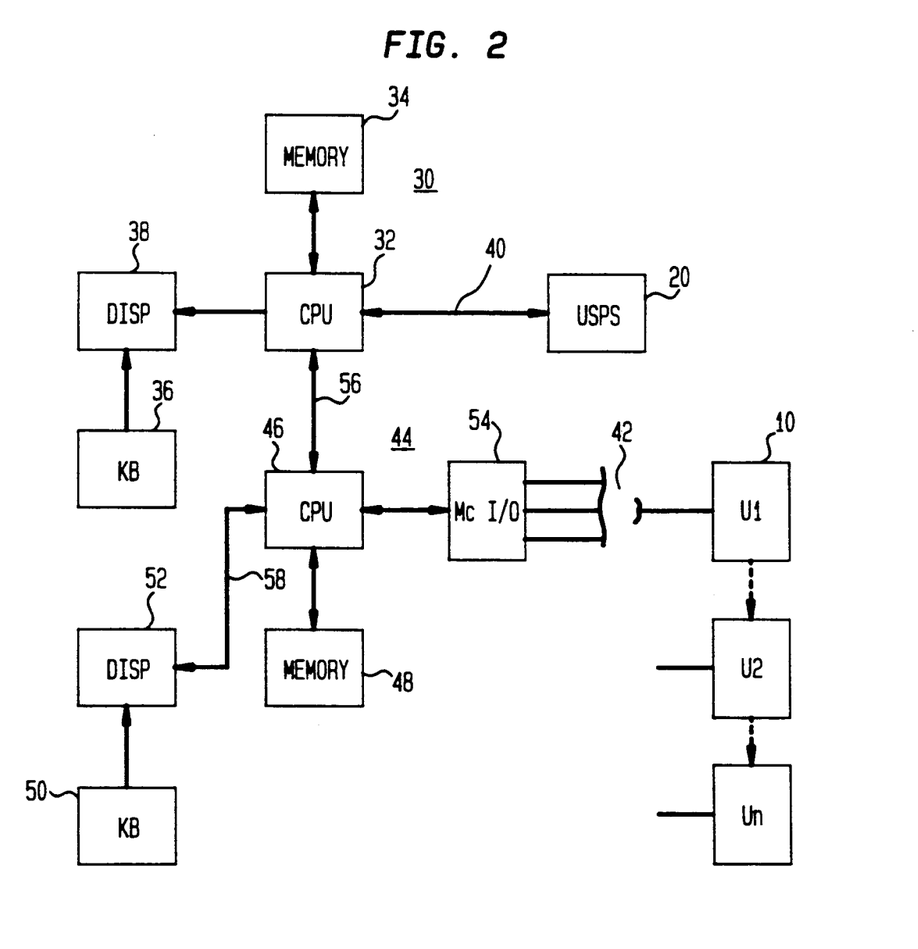
FIG. 2 is a more detailed block diagram of the system of FIG. 1.

With reference to FIG. 2, a more detailed functional component relationship of the system of FIG. 1 is illustrated. Thus, the data center includes a first data channel 30 which includes a CPU 32 having a program memory 34, a keyboard 36 and an appropriate display 38 coupled thereto. Data communication link 40 interconnects CPU 32 to the U.S. Postal Service 20. The user 42 to a second data channel 44 which includes a CPU 46, a program memory 48, a keyboard 50 and an appropriate display 52. The CPU is coupled to the data links 42 by means of a multi-channel IO device 54 capable of high speed data communication.

In operation, two-way communication between the data channel 30 and the U.S. Postal Service 20 provide a continuous interchange of information regarding updates of U.S. Postal Service rules and regulations covering rate reductions and as may be required for the continuous certification use by the local users 10. In addition, the data channel 30 may also be manually interrogated by means of keyboard 36 for inquiring of the Postal Service for specific information which may be employed with regard to compliance with certifications, the answering of specific data questions, or other uses requiring specific interrogation by means of the central station to the U.S. Postal Service. Since the U.S. Postal Service link is a two-way communication over channel line 40, it is possible through this link for the U.S. Postal Service to interrogate and monitor the operation of the first data channel 30 and the second data channel 44, for compliance with quality control and other security compliances which may be required by the U.S. Postal Service.

Turning now to the second data channel 44, high speed continuous two-way communications with respect to continuous update of U.S. Postal Service requirements for certification, servicing and diagnostics, training, and other information interchange, are effected by means of the CPU 46 operating through the high speed data channel 54 interfaced along with communication lines 42 to the multiple user network U1, U2 . . . Un. Operating under control of the program memory 48, which also stores data, the CPU 44 is contemplated as a high speed multiple processing information apparatus of conventional design such an IBM 3083 or a CD VAX unit which may handle multiple requests from any one or more of the users simultaneously through the multiple channel I/O device. Keyboard 50 and display 52 may be utilized for manual information interchange between any of the local users and the information operator. Although only a single keyboard display unit is illustrated, it will be understood that dataline 58 is a schematic representation of the existence of a multiple number of display keyboard combinations evidencing the use at the central station of a plurality of key operators available to answer user questions upon interrogation.

Figure 3:
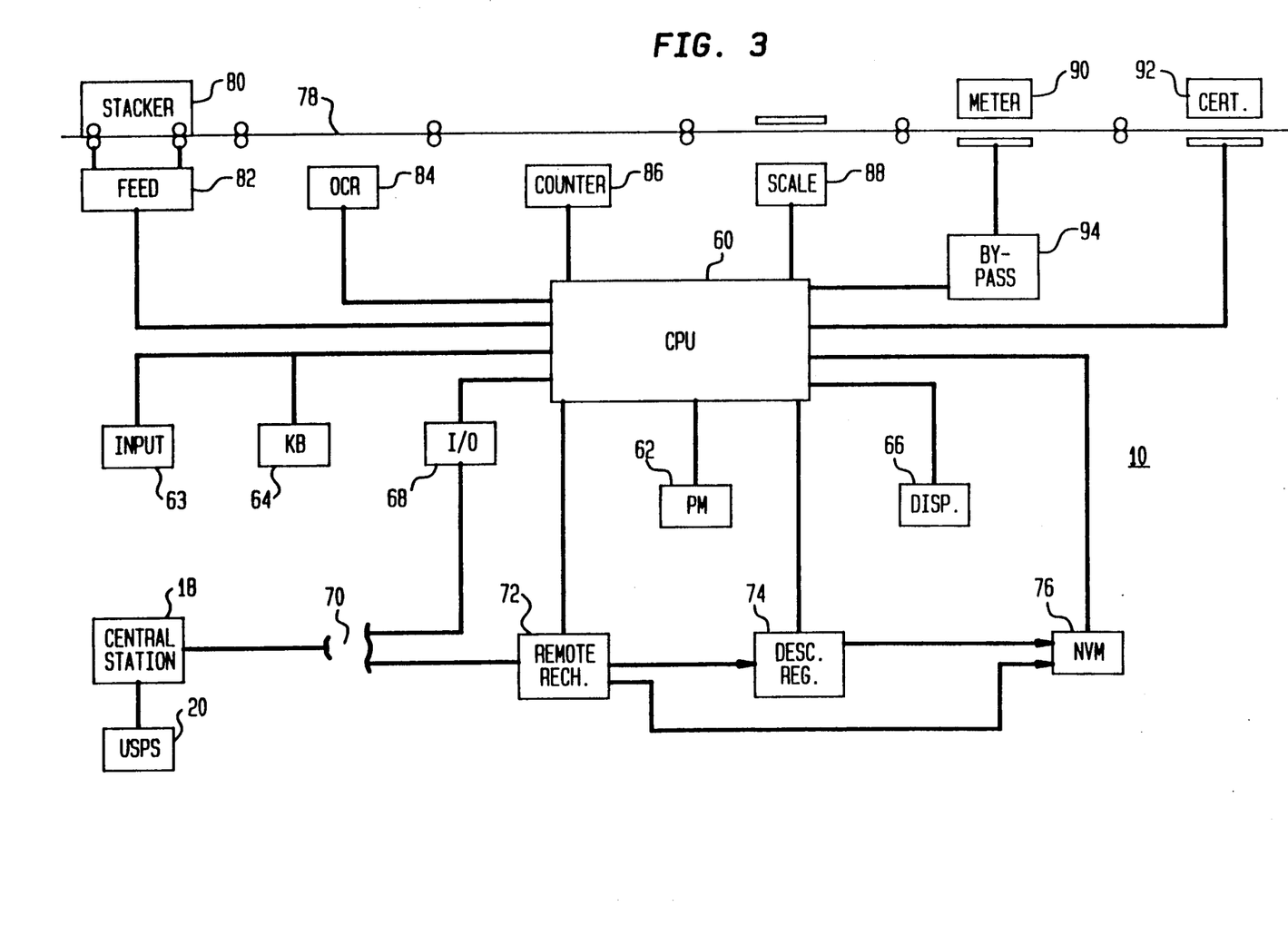
FIG. 3 is a more detailed block diagram illustrating a user station.

Referring to FIG. 3, a function block diagram illustrating the interrelationship of typical components within each individual user station is illustrated. The central user station operates under the control of a CPU 60, which includes a RAM memory and appropriate control registers. Coupled to the CPU 60 is a program memory 62 which defines the essential function of the system, including updating instructions and rates used in the local user units, diagnostic monitoring, a two-way communication link establishing a tracking facility utilizing, for example, the encryptic key represented by the certification, and interface capabilities with respect to the central station for the downloading of training information which enables operators at local stations to understand and comply with specific requirements imposed by the U.S. Postal Service with respect to the certification process. These capabilities are described in more detail in the related applications Ser. Nos. 285,891 and 285,486. Coupled to the CPU 60 are a keyboard 64 for the manual entry of data requests and other information into the CPU, display unit 66 and an I/O channel 68 coupled by means of a data link 70 to the central station 18. Accounting information and funding to the local user 10 is effected through the data link 70 from the central station 18 to the remote recharger mechanism 72, operating in accordance with conventional recharging techniques, such as disclosed in U.S. Pat. No. 4,787,045, assigned to the assignee of the present application. Remote recharging unit 72 charges a descending register 74, in conventional manner, which keeps track of descending balances charged from time to time in accordance with mail requirements. Non-volatile memory unit 76 is employed to maintain security of information during periods of time when local user unit 10 is not operating. Non-volatile memory 76 receives descending register balances as part of a shutdown routine, along with other security data which may be applied from the active memory of the CPU 60. Remote recharging operations are carried on in remote recharging circuit 72 via the data link 70 to the central station 18, and operates independently of the OFF/ON status of the local user unit 10 for monitoring purposes. Thus, even if the local unit 10 is turned off, central station 18 through data link 70 may inquire through the remote recharging unit of the status of certain pieces of information which are maintained either in the RAM memory portion of the CPU 60 during on-times of the unit 10 or in the non-volatile memory 76 during inactive status periods. Another accounting system is described in commonly-assigned U.S. Pat. No. 4,796,193.

A concept of work sharings entail the performance of certain postal service functions by the user in a secure manner so as to enable the user to apply not only postage but to also apply certification, as an imprint on the mail piece, which will be accepted by the postal service that the services certified were in fact performed by the user and thus enable the user to be entitled to further mail rate reductions. Communication in contrast may also be by means of a code or other form with the relevant information transmitted in encrypted format. The information may be scanned and used to automatically set the postal equipment at the user site to proper settings, both for postage enhancing security and efficiency.

Certification information is provided to the CPU through a plurality of inputs along a mail path designated as 78. Mail piece documents which are stacked in appropriate feeder-stacker unit 80 are, under control of CPU 60 through feeder-unit 82, driven along the mail path 78, past OCR unit 84 where printed material on the mail piece is read, past counter station 86 where individual pieces are counted, to the scale unit 88 where the mail piece is weighed, and thence to a metering station 90 for application of appropriate postage and finally to a certification station 92 where appropriate certification stamps may be placed on the mail piece to indicate compliance of the mail piece with all the criteria that have been set under work sharing requirements required under relevant U.S. Postal Service regulations. Since the unit may be capable of handling prefranked mail, a meter bypass network 94 operating under control of the CPU, provides for bypassing of the mail piece of the metering station 90 without the necessary application of additional postage. Problems encountered in short-weight mail may be adjusted by appropriate decrement of the descending register balance in descending register 74 under program control through CPU 60, based upon differences detected by the computer between applicable postage rate requirements and the actual mail run being passed through the user station 10. An example of short-weight mail is disclosed in copending application Ser. No. 285,146, filed concurrently herewith, and assigned to the assignee of the present application.

The data exchange between the central station and the user station give rise to further novel and unique processing capabilities in accordance with copending application Ser. No. 285,486. The user equipment can be periodically interrogated as to the customer usage patterns, mail runs, addressees, zip codes, rate breaks, etc. Based on this usage information, information can be down loaded to the user. The down loaded information includes advisory procedures, such as the fact that postal charges for first class mail will increase shortly and that any mail run should be pushed out early, the fact that the user has the ability to avail itself of zip code breaks and other useful information as to mailing habits. In mail addressing, the data base incorporated by the central station also can benefit the user by expansion of the user equipment far beyond its limited nature by taking advantage of the relatively larger data base facilities available at the data center. One particularly advantageous use of the communication capability is the uploading of user mailing lists to a data center. At the data center, the information can be processed relative to the data center data base to sanitize the mailing address list. This includes noting improper zip codes, changes in carrier routes, changes in addresses when people move, etc. The information is thereafter down loaded to the user mailing equipment at the user location to allow the generation of sanitized effective mailing lists. This enables the user to have a higher "hit" rate of properly addressed and properly delivered mail. Moreover, the system provides a tremendous advantage to the U.S.P.S. Billions of dollars are spent in redelivering mail which is improperly addressed. Mail can be improperly addressed for a number of reasons including the fact that an individual has moved and the new address data has not been properly entered into the system. By providing this service to, say, the top 500 mailers in the country, which constitutes in the area of 80% of the mail in the country (3rd class), a tremendous amount of expense would be saved by the Postal Service. Where the mailing lists are small, the businesses can upload their mailing lists to the data center. The uploaded mailing address are sanitized and processed, and in this instance, the center can provide the actual mailing service for the small business by providing the printing of the necessary inserts, inserting the material into the envelopes and addressing and distributing them. Alternatively, the center can download the address list to the mail business in the appropriate format. It can also be presorted by order with an indication as to the appropriate postage amount. The postage chargeable when the data center provides the mailing service can be directly charged to a user account. Additionally, demographic analysis can be done on the mailing list to identify additional customers who would fall into similar categories and are not yet being serviced by the small business. Moreover, by demographics analysis, other business opportunities for customers of the type serviced by the small business can be identified and provided to the user. The system would include sufficient security to ensure that the mailing list data for the customer is not improperly utilized. This has been described in more detail and claimed in a copending application Ser. No. 285,145, filed Dec. 16, 1988, and concurrently filed application Ser. No. 416,745 which describes and claims extensions of these concepts.

DETAILED DISCLOSURE OF PREFERRED EMBODIMENTS OF PRESENT INVENTION

While the earlier Application described the downloading to the user of training assistance, preferably in an interactive mode, it had the disadvantage that some of the instructional assistance provided might not be relevant to the user's needs, and might not provide the kind of details that would enable the user to profit most from the information.

The present invention recognizes that customizing or personalizing the training will enable the user to cut costs even more, by undertaking more preprocessing to lighten even further the processing burden of the Postal Service. This has the merit of not only enabling the user to maximize his mail handling efficiency, but equally important it reduces the Postal Service workload, a benefit for the entire nation.

What the present invention also recognizes is that the information needed to tailor the training for a particular user already exists, for the most part, in the data center of the system described in the referenced Application. In other words, the data center already possesses a database which includes the user's location, its mailing output, the distribution of addressees, the class of mail, the size of packaging involved, and other factors concerning the mailer's operations, because much of this information is provided in the documentation that accompanies bulk or batch mailings to the Post Office. Moreover, if the user has taken advantage of the equipment purchasing or leasing arrangements described in the commonly-assigned, copending application Ser. No. 285,904, filed Dec. 16, 1988, then the data center also has complete information on the equipment present at the user's facility or that the user plans to acquire. Even if such knowledge is not present at the data center, it is a relatively easy step for the data center to request of a user a listing of the mail processing equipment used by the user. With this information on-hand, it is an easy task for a computer to select from a library of training program modules a module personalized to the user's day-to-day activities. Or, alternatively, to scan through a large set of training programs customized for typical users and select those programs that best fit what may be termed the user's profile, meaning its usage pattern, equipment, personnel, mailing habits, volume, addressee or zip distribution, mail finishing, postal discounts available or sought, and other factors that distinguish one mailer's operations from another. Specific examples of user's profiles that require personalized training also include typical mail finishing employed, whether addressees are on a rural list or include P.O. boxes, particular geographic area destinations, typical classes of mail used, whether foreign language surnames are common, common package sizes and weights.

Figure 4:
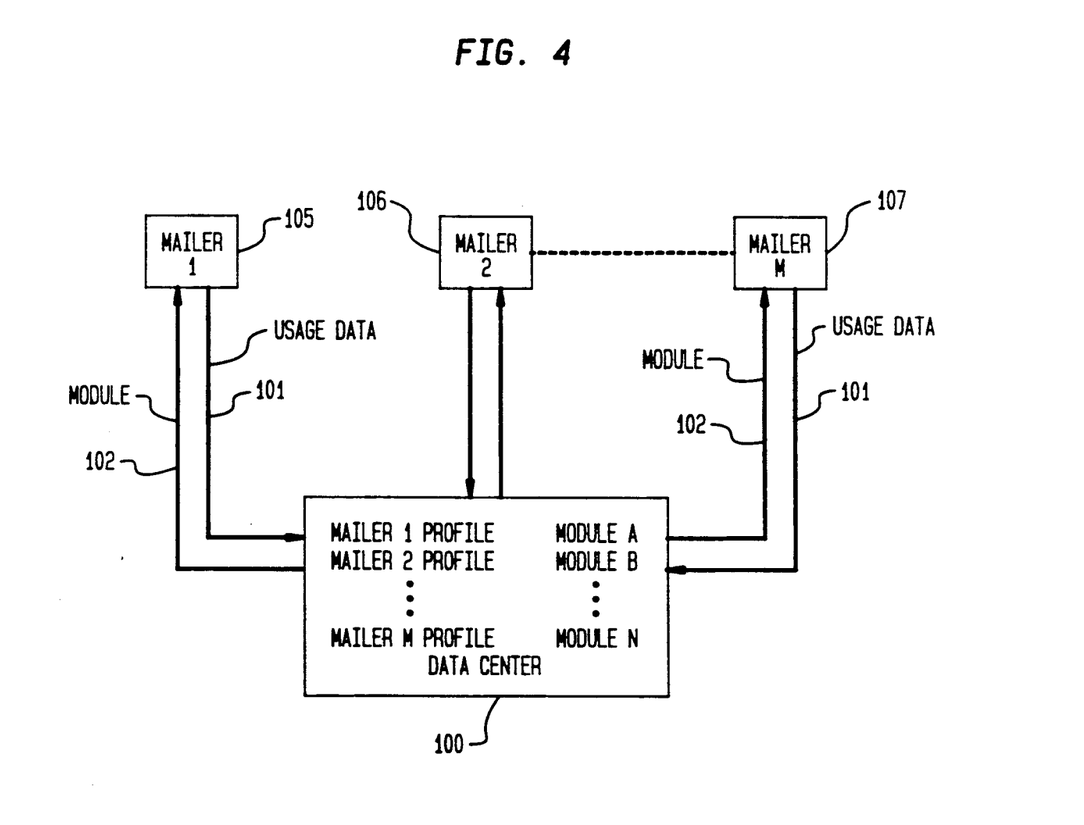
FIG. 4 is a block diagram illustrating an embodiment in accordance with the present invention.

FIG. 4 is a schematic diagram illustrating this aspect of the invention. The data center represented by block 100 contains a data base of mailer profiles, and a library of training modules A..N. The data center 100 is connected by way of 2-way data communications links 101, 102 to each of a plurality of mailer 1..M represented by blocks 105, 106 and 107. In the network as depicted in FIG. 2, each mailer continuously uploads to the data center via link 101 data representative of its activities which become part of its profile as stored in the data center. When it comes time to provide training programs to a user, the appropriate module is selected from the library of modules and downloaded to the user via data link 102.

The network's ability to download information in large quantities allows the data center to provide to the local user's station training packages which may be employed by the local user for training new employees and acquainting other employees with additional means and methods by which postal efficiency may be achieved under the work-sharing concept. This includes training current employees in new techniques in a self-instruction mode interactively, with the user's terminal assisting in the training of employees.

Figure 5A:
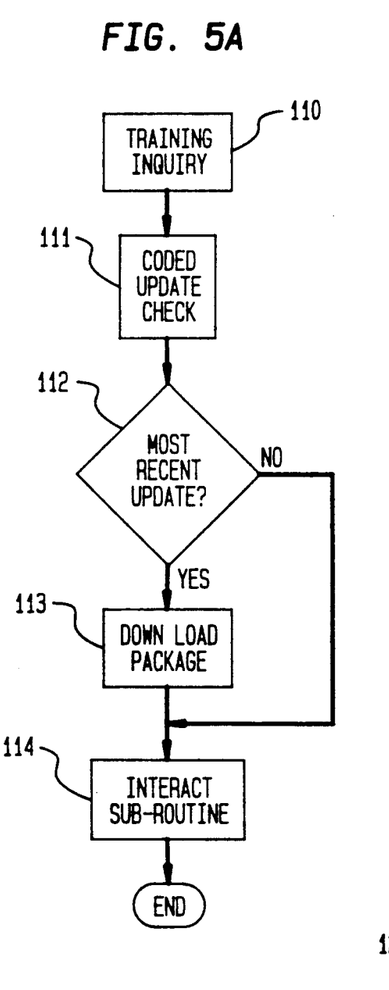
FIGS. 5A-C are flow charts illustrating the operation of the apparatus shown in FIGS. 2 and 4.

For example, as illustrated in FIG. 5A, a training inquiry by a local user can be initiated 110 from its keyboard. The request is routed to the data center's central processor. In response, the data center transmits a code representing the most recent updated training package 111. Upon receipt, the local user station compares this code to a code identifying the most recent update previously stored in local memory 112. If the latest data center program matches the stored program, the downloading step 113 is skipped and the local station begins providing training as an interactive subroutine 114 using its current programs. If it is not the latest version, the downloading is provided 113 and the subroutine runs the version that was downloaded to local memory. Thus, each local user training session will employ the latest updated training package.

Figure 5B:
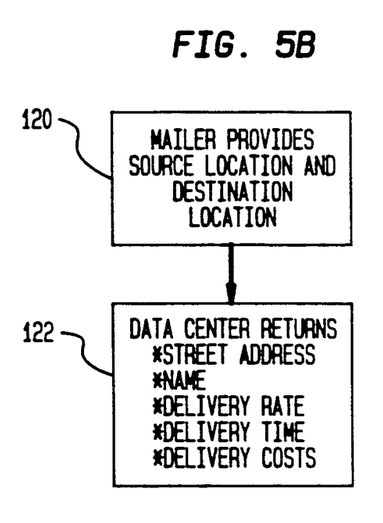

What will now be described is an example of one relatively simple mode for personalizing the training materials sent to the user as described in FIG. 5A. This is illustrated in the flow diagram of FIG. 5B. In block 120, the mailer provides to the data center via the network its location and the destination, say by zip code or address, of a particular mail piece or batch of mail it intends to mail. From its database of mailer addressees, the data center in block 122 returns to the mailer the street address or name of the addressees, the postage to that destination, the estimated delivery time, and the overall delivery cost. The data center can also inform the user of any discount it would be entitled to if so many pieces of mail were sent to the same zip code, or if the bulk mailing were pre-sorted and how to pre-sort, or if the mail piece were addressed with a certain font for a named local Post Office or were bar-coded. Moreover, more details of each of the required procedures to follow for this particular mailing to obtain a particular discount is readily provided to that mailer. The amount of information that needs to be stored to be able to provide to the mailer the above personalized information is very large. Moreover, the task of keeping it up-to-date is equally huge. The cost to a mailer, especially a small business mailer, is prohibitive. A feature of the invention is that the cost of storing and maintaining a database of the magnitude above-described, when spread over many mailers or users, reduces to a manageable figure per user. Hence, all users on the network can benefit from the availability at the data center of the foregoing kind of personalized material. And the public likewise benefits, because intelligent users, using intelligently the Postal Service, lightens its workload and improves its performance.

Figure 5C:
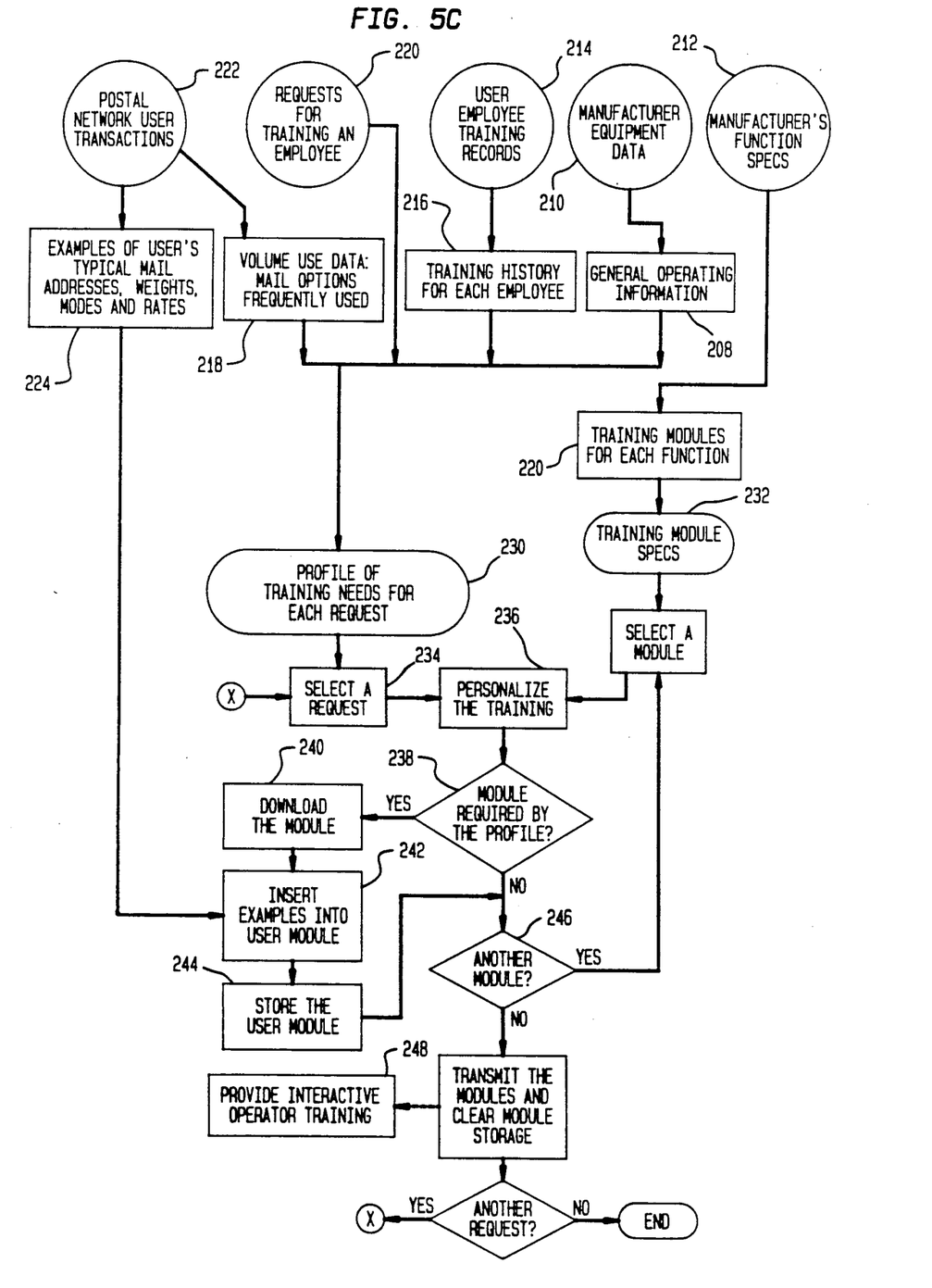

FIG. 5C illustrates a more sophisticated way in which the data center can assist users to improve their mail-processing functions. In this example, locally-stored data reflecting mailing transactions and employee training is also used by the user CPU in conjunction with centrally-stored data accessed over the network link to automatically provide personalized training for the user's employees. In the particular operation shown in FIG. 5C, records 208 are stored at the data center as provided via the network by suppliers of equipment 210 for the user's work-sharing installation. These can be downloaded from the network by the user CPU. The information in those records, the functions 212 specified in the particular training request, the particular employee's training history 214, 216 and the volume of mail 218 processed at the user's installation using particular functions, are then formatted into a standardized training profile. Training modules for each function 220 can also be downloaded in response to the training request. When the training request 220 is made by the user, the user can also supply, if not already present in the data center databases, its postal transactions 222 and specific examples 224 of its usage for which it desires specific training assistance. This information is assembled at the data center, or at the user's installation, into a profile of 232 personalized to the user's equipment. The diagram of FIG. 5C shows a generalized picture combining several typical transactions in which selections 232 are made in accordance with a user's request 234 and its training, depicted in block 236. The matching of module to profile is depicted in decision block 238. If correct, the module may be downloaded 240 to the user, the examples inserted and the module stored 244, or the module stored at the data center. The process iterates 246 until the module selection process is complete. Then the interactive operator training 248 at the user's installation can take place after the selected modules have been transmitted to the user.

The network is readily adapted to keep users up-to-date on various mailing products. The selection can be based on the user's equipment or its mailing destinations.

As will be appreciated, the personalization of the training material for a user can readily be customized for employees of different skill levels for the precise equipment on the user's premises.

It will also be appreciated that the system herein described can readily be integrated into the work-sharing networks described in the referenced copending Applications.

As will further be noted, by relatively simple, straightforward programming, the provision of personalized materials to postal users can be readily achieved in accordance with the needs and resources of the entities involved to the benefit of all members on the network. The public benefits because optimized use of postal facilities reduces distribution costs, and the involved Postal Service operations and costs are also reduced.

As also will be noted, the system and methods described herein can be used alone, or in combination with many of the systems described in the referenced copending applications. For example, the referenced copending applications Ser. Nos. 285,145 and 285,486 relate, respectively, to networks which allow updating of customer lists by a data center, and to networks in which a data center creates databases of mailer activities for selective accessing by mailers to improve their operations. Those systems are readily integrated with the system of the present invention, since the same equipment can be used, the major difference being the information stored at the data center and the data processing criteria. The same applies to the certification system described in application Ser. No. 285,891.

It will be evident to those skilled in the art that, from the network descriptions give herein and in the referenced Applications, it is a relatively straightforward development to construct such a network and establish the data communications links that will allow the data center to perform the functions described herein. Also, those skilled in the art will recognize that creation of the databases described, and programming of the data center computer to process the stored information to select suitable mailing material from a library of information is also a straightforward project development using programming and development tools available from many vendors. Any known, suitable, selection algorithm can be employed, in addition to the preferred ones described above. The processing time is not critical, and thus, while desirable, it is not critical to the invention that the database are built and processed rapidly or that access time to the network is short.

While the invention has been described and illustrated in connection with preferred embodiments, many variations and modifications as will be evident to those skilled in this art may be made therein without departing from the spirit of the invention, and the invention as set forth in the appended claims is thus not to be limited to the precise details of construction set forth above as such variations and modifications are intended to be included within the scope of the appended claims.

I claim:

1. Apparatus for training a postal system user to perform postal functions, said apparatus comprising:
   a user station having a plurality of means for performing postal functions for postal transactions initiated by the user;
   means remote from and in communication with said user station for:
   storing data representing postal transactions initiated by said user;
   storing training modules; and
   providing to said user a personalized training module in accordance with said user's postal transactions.

2. Apparatus as claimed in claim 1, further comprising:
   means for selecting examples of transactions from said stored mailing data and;
   means for inserting at least one of said examples into a training module.

3. The apparatus of claim 1, further comprising means for requesting a training module.

4. The apparatus of claim 3, further comprising means for providing interactive operator training using said module with said insertions.

5. A system for training a postal system user to perform postal functions in a multicomponent interrelated system, said system comprising:
   a data center having a data processor and storage means;
   a plurality of user stations each having a data processor, storage means and means for performing postal functions;
   data communication links interconnecting each of said user stations with said data center;
   means at said data center for maintaining a database of user profiles, means at said data center for storing a plurality of modules of training materials for postal users; and
   means for personalizing a set of training materials for a particular user in accordance with its user profile and transmitting same via a data link to said particular user.

6. The system of claim 5, wherein each said user station comprises means for storing mailing data representing a plurality of its postal functions;
   means for transmitting to the data center data representative of said mailing data.

7. A system for assisting a user to perform postal functions, comprising:
   (a) a data center having a data processor and databases of information relevant to efficiently using a postal system;
   (b) a plurality of user stations having a data processor and means for carrying out postal functions;
   (c) data communications links interconnecting each of the user stations with the data center;
   (d) each said user station comprising means for transmitting to the data center its location and data representative of mailing transactions to be carried out by the user; and
   (e) means at said data center for transmitting to a user station data representative of information personalized for said user station.

8. The system of claim 1, wherein the data transmitted by element (d) includes destination information for a mailing transaction.

9. The system of claim 1, wherein the data transmitted by element (e) includes address information and delivery costs from the user's location to the destination.

10. A method of training a postal system user to perform postal functions in a multicomponent interrelated system, said method comprising the steps of:
    storing mailing data including data representing postal transactions by a user;
    using said stored data to determine data representative of training materials personalized for said user; and
    transmitting said training material data to said user.

11. The method of claim 10, further comprising the step of determining and communicating a module of training materials to said user.

12. The method of claim 10, further comprising the step of personalizing said module by inserting therein examples of the user's postal transactions.

13. A method of assisting a postal system user to perform postal functions in a multicomponent interrelated system, said method comprising the steps of:
    storing mailing data representing a plurality of user postal transactions at a data center including location of the user;
    at the user's location, querying the data center concerning a particular postal transaction that the user intends to make; and
    transmitting from the data center to the user data representative of information that will assist the user in carrying out said transaction.

14. The method of claim 13, further comprising the step of transmitting to the user a module of training materials personalized in accordance with the user's stored mailing data.

* * * * *